United States Patent
Sparling

[11] 3,891,899
[45] June 24, 1975

[54] CONCRETE UTILITY POST WITH METER, GAS LINE AND WATER LINE

[76] Inventor: Donald F. Sparling, P.O. Box 2294, Delray Beach, Fla. 33444

[22] Filed: June 26, 1973

[21] Appl. No.: 373,641

Related U.S. Application Data

[62] Division of Ser. No. 163,919, July 19, 1971, abandoned.

[52] U.S. Cl. ............ 317/105; 52/221; 174/38; 137/356
[51] Int. Cl. .............................. H02b 9/00
[58] Field of Search ......... 52/103, 21, 27, 40, 220, 52/221, 173, 722; 317/104, 105, 109; 174/38, 45 R, 52 R, 48, 51; 137/356

[56] References Cited
UNITED STATES PATENTS

| | | | |
|---|---|---|---|
| 1,537,008 | 5/1925 | Forni | 52/21 |
| 1,585,411 | 5/1926 | Patterson | 52/103 |
| 1,962,915 | 6/1934 | Sharp | 52/221 |
| 2,036,054 | 3/1936 | Knapp | 52/221 |
| 2,358,343 | 9/1944 | Maxey | 52/40 |
| 3,338,254 | 8/1967 | Regal | 52/27 |
| 3,450,951 | 6/1969 | Boyle | 174/38 |
| 3,472,272 | 10/1969 | Bertics | 137/356 |
| 3,614,538 | 10/1971 | Nickola | 174/38 |
| 3,652,779 | 3/1972 | Grinols | 174/51 |
| 3,796,822 | 3/1974 | Eickman | 174/48 |

*Primary Examiner*—Robert K. Schaefer
*Assistant Examiner*—Gerald P. Tolin
*Attorney, Agent, or Firm*—Duckworth, Hobby & Allen

[57] ABSTRACT

A precast concrete utilities post apparatus is provided for making a utilities post adapted for use in mobile home parks, campsites, and the like, for rapidly connecting campers and mobile homes to utilities. A precast concrete post has an enlarged end having meter and power boxes connected back to back and formed in the enlarged end of the concrete post with the conduit and utility pipes running through the post.

4 Claims, 3 Drawing Figures

PATENTED JUN 24 1975　　3,891,899

SHEET　　1

INVENTOR.
Donald F. Sparling

BY Duckworth & Hobby
ATTY'S.

CONCRETE UTILITY POST WITH METER, GAS LINE AND WATER LINE

This is a division of application Ser. No. 163,919 filed July 19, 1971 now abandoned.

BACKGROUND OF THE INVENTION

The present invention relates to utility posts and to a reinforced precast concrete utility post for use in camp grounds, mobile home parks, and the like.

In the past it has been common in camp grounds and mobile home parks for providing utility hookup for campers and newly placed mobile homes in mobile home parks which utilities connections generally have an electrical hookup along with meter box and meter for reading the amount of electricity used by the camper or mobile home. They also frequently provide connections for water and sometimes gas. Generally these connections are run to the site either above, or below ground and a treated wooden pole, such as a short creosote treated post, is placed in the ground for attaching the connections, power and meter boxes to. These connections, however, are generally unsightly and produce a cluttered effect without providing any protection from the weather for any of the connections. In order to overcome the use of treated posts, it has also been suggested to utilize posts formed of concrete which are placed in the ground and utility connections run to the post with the power box, or the like, attached directly to the concrete post. These prior systems, however, require wiring of the boxes and attachment to the post at the site, still producing an unsightly feature in a camping or mobile home park and do not provide any protection from the elements or any means for handling the post.

It is accordingly one object of the present invention to provide a precast concrete utilities post fully assembled and ready to insert into the ground with power and meter boxes and connections encased right into the post, and also to provide a convenient lifting handle located at a balance point of the post for lifting with a crane, winch or similar device for ease of handling in assembly and installation.

It is another object of the present invention to provide a precast utilities pole which is inexpensive to manufacture and requires a minimum of assembly at the site of installation, allowing most of the assembly to be performed at the factory, and which provides protection against weather elements as well as against accidental bumping by cars or trailers during hookup.

SUMMARY OF THE INVENTION

The apparatus of the present invention teaches a utility post in which power and meter boxes are bolted together back to back with a nipple therebetween, which boxes are sealed in an enlarged portion of the reinforced concrete utility post. The meter box has a thin wall conduit connected thereto leading down the length of the post. Gas and water lines may be included and a lifting handle is provided at the approximate balancing point of the post for lifting the post into position. This handle is adapted to be cut off once the utility post is installed. A ground connection is also provided in the post along with a nipple between power and meter boxes.

BRIEF DESCRIPTION OF THE DRAWINGS

Other objects, features and advantages of this invention will be apparent from a study of the written description and the drawings in which.

DESCRIPTION OF THE PREFERRED EMBODIMENTS

Figure 2:
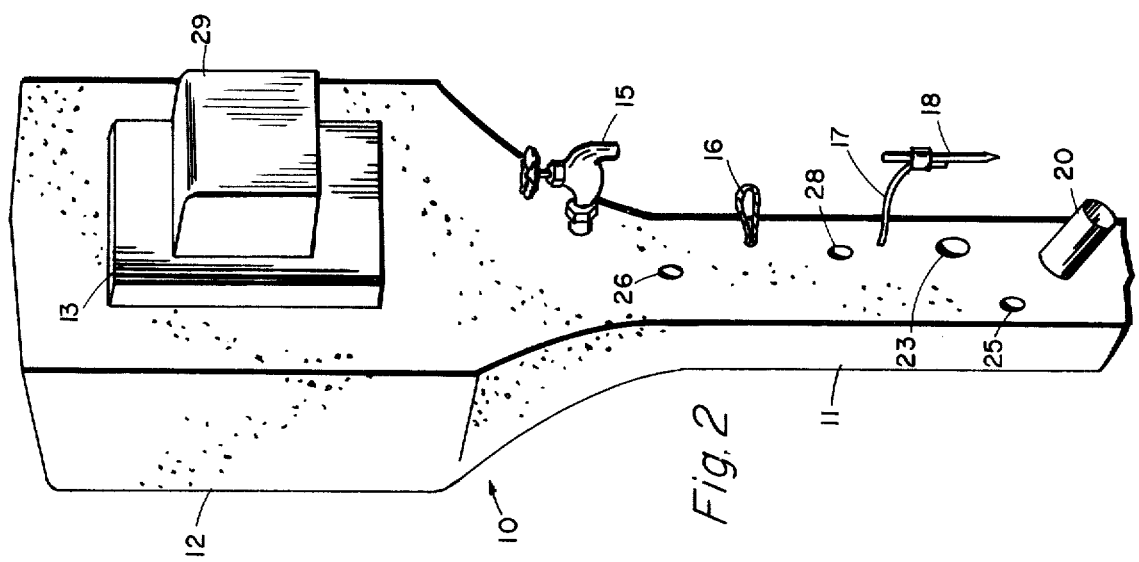
FIG. 2 is a perspective view of a utilities post in accordance with FIG. 1.
Figure 1:
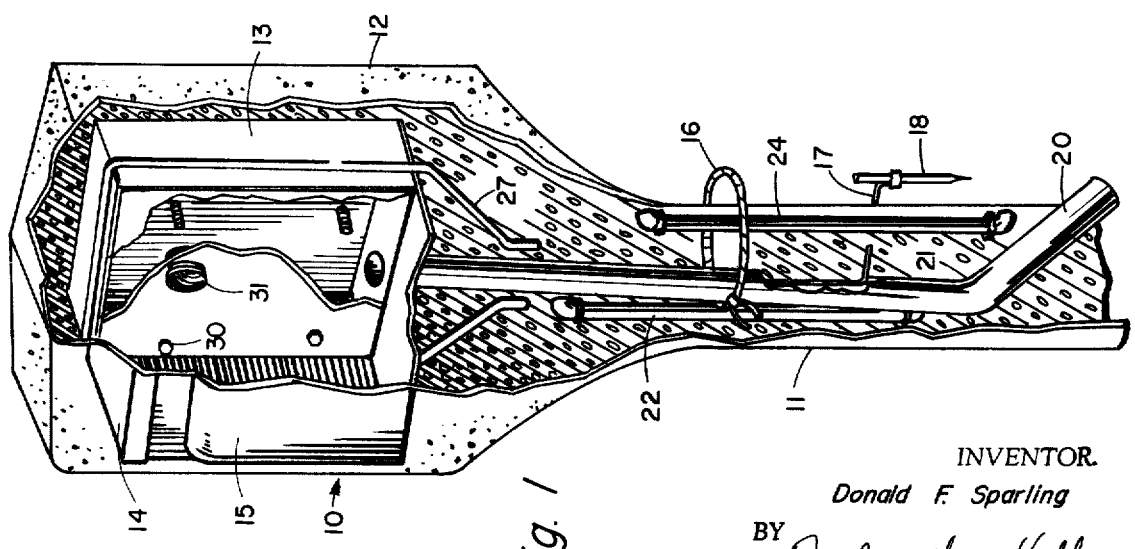
FIG. 1 is a perspective view with portions cut away of the apparatus in accordance with the present invention.

Referring now to FIGS. 1 and 2, a precast, reinforced concrete utilities post is shown which is adapted for placement into the earth for connecting utilities to campers, mobile homes, and the like, in camp grounds and mobile home parks. The post 10 has an elongated concrete portion 11 with an enlarged end 12 and has an electric meter box 13 for attaching an electric meter to for reading an amount of electricity used on a connection made in an electric power or panel box 14 on the other side of the enlarged portion of the post 10. Post 10, as seen in FIG. 2, has a water connection for tap 15, flexible handle 16, which handle is located so that the post may be grabbed and lifted with a crane or winch or similar device for placing the post in place. The post also has extending therefrom a ground wire 17 which may be copper wire connected to the ground post 18 for placement in the earth for grounding the panel and meter boxes 13 and 14. A thin wall conduit 20 extends out of the elongated narrow end portion 11 of the post 10 and extends through the post and connects to the meter box 13. This conduit 20 is bent at 21 to maintain it within the straight post 10 but allowing its end to protrude from the post at the desired point where it can be connected to other pipe or may have exterior wiring not requiring conduit feeding in from below the ground. The utilities post 10 also has a water pipe 22 therein extending from an opening 23 to the tap 15 for connecting up the water line and a gas pipe 24 extending from the opening 25 to an opening 26 for the addition of a gas line for connecting up natural gas or other types of gas for use by the campers or mobile homes. Depending upon the particular location, however, this connection may be deleted if desired, and it should also be pointed out that a telephone connection can be provided in the utility post without departing from the spirit and scope of the present invention. The entire unit has reinforcing rods 27 therein which may be reinforcing steel rods, which rods are especially required in the enlarged end 12 of the post 10, since a great portion of this part of the post is taken up by the hollow boxes 13 and 14 leaving relatively thin concrete walls surrounding the boxes. The post 10 is also provided with a nipple or other mark 28 for marking the exact location of the post to be placed into the earth so that all the posts in the particular camp ground will be of the same height in the ground.

Referring now to the upper portion 12 of the post 10, the power box 14 is a standard metal panel box having a cover 15 and generally includes the wiring for the connections to be made and also the necessary fuses or relays. Similarly, the meter box 13 will have a meter attached to the outside for reading the amount of power used, which power will typically be 120 Volt 60 Cycle AC, but in the case of large mobile home parks, could also be provided with 220 Volt AC source or any other source desired. The box 13 contains the wiring for the meter and also is bolted to the box 14 by means of bolts 30, and has a nipple 31 connected between the boxes for the wiring to pass from the meter box into the power box which acts as a ground between the boxes and also provides code requirements for the entrance of the wiring. The particular materials of the present utility post can be varied as desired, but as one example: 5,000 PSI concrete could be used for the post having No. 4 reinforcing rods in the elongated portion, and No. 2 reinforcing rod surrounding the panel boxes. The meter box could be an integrally cast standard 200 Amp. meter receptable with the meter attached to it, while the power panel box could be an integrally cast weatherproof power outlet with 100 Amp fusible connections with 1¼ inch bushed conduit nipples between the power and meter boxes. Two inch galvanized rigid conduit pipe can be used for the connection to the meter box. The underground power cables and meter would of course be put on by a power company in a typical situation after the utilities post was placed. The post is of course factory wired between the power outlet and the receptacle.

Figure 3:
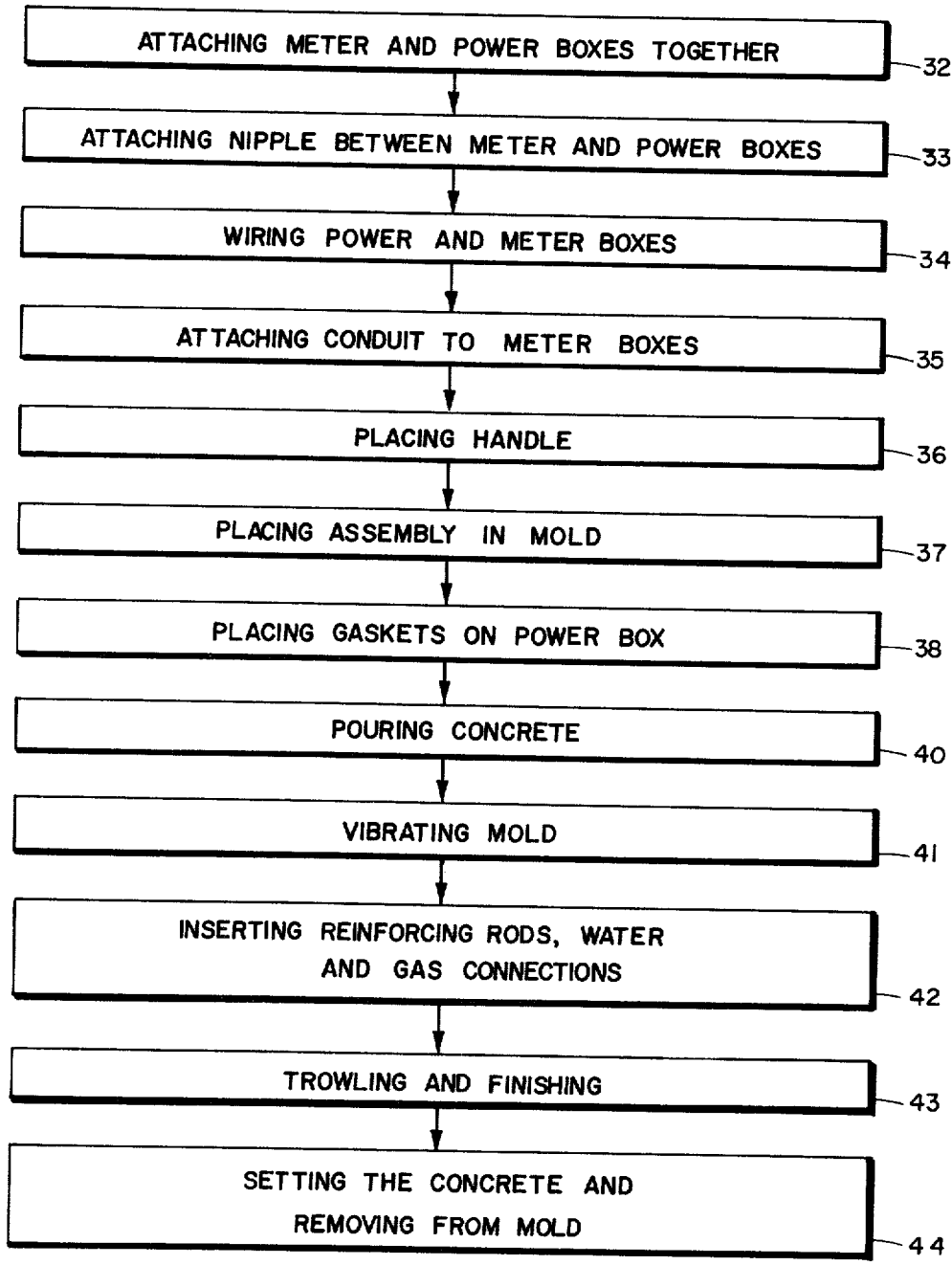
FIG. 3 is a flow diagram of the method of manufacturing the post of FIGS. 1 and 2.

Referring now to FIG. 3, a flow diagram of a method of manufacturing the concrete utilities post of FIGS. 1 and 2 is illustrated in block form, and in which the usual order of steps is set forth, but which in some instances the steps could be changed as to order. The first block 32 includes attaching a meter box 13 and power box 14 together with screws or bolts 30 (FIGS. 1 and 2), followed by attaching the nipple 31 between the meter and power boxes 13 and 14 in block 33. Wiring 34 the power and meter boxes to the desired specifications including grounded plug and receptacles in the fusing circuits in the power box is followed by attaching the conduit 20 to the meter box so that a unit is provided at this point that only requires an electric power company to pass the wires through the conduit 20 into the meter box which is ready for the meter to be attached to the meter box. The power company will put the electric meter 29 onto the meter box 13. The placing 36 of the handle 16 around the conduit 20 at a predetermined point for handling the assembly before and after placement of the concrete is then accomplished and step 37 provides the placing of the assembly into a mold which can be a fiberglass mold of the general exterior shape of the post 10. A gasket is required surrounding the power box 14 which is in the bottom portion of the mold and extends through an opening or in a passageway fitted to the dimensions of the box 14 whereby the gasket will press against the box and against the surrounding portion of the opening of the mold to prevent the concrete from flowing down around the protruding portion of the panel box thereby ruining its appearance and interfering with the operation of the cover 15 of the power box. The placing of the gasket in step 38 is directly onto the box 14 in the preferred embodiment but this gasket or seal can be placed in the mold. Once the assembly has been properly placed in the mold, the pouring 40 of concrete is accomplished but it should of course be understood that cement or other cement mixtures or any other hardening fluid material can be utilized in place of the concrete, the concrete being utilized in the preferred embodiment. Vibrating 41 of the mold is for removing air bubbles, voids, and the like, in the concrete, which might otherwise weaken the utility post. Placing 42 of the reinforcing rods 27 in the desired locations in the wet concrete by hand, and placing the water and gas connections if they are to be used requires insertion in the mold by hand in the proper location. The top surface of the mold is then trowelled and finished at 43 to give a smooth surface, and setting 47 of the concrete allows it to harden, at which time the utility post 10 may be grabbed by the handle 16 and removed from the mold and shipped to the site for installation. The method could also include the step of inserting a telephone connection in the post if desired, and the mold may include a mark 28 for locating the depth that the post is to be inserted into the earth.

It should be clear at this point that a utility post has been provided which can be ideally manufactured complete with boxes, wiring and connections in a factory for shipment to a campsite, or the like, thereby eliminating the necessity of having electricians do the wiring and attachments on location. Once the utility posts are installed in the ground, the electric power company will run the wiring in the meter box, connect them and attach the meter so that the unit is ready for operation. The gas company will attach the gas line to the unit if gas is being provided, and the phone company will run the phone lines to the utility post. Typically, however, the water lines will have to be run by the camping and mobile home park to each unit where it is immediately connected to the utility post.

However, this invention is not to be construed as limited to the particular forms disclosed herein, since these are to be regarded as illustrative rather than restrictive.

I claim:

1. A precast concrete utilities post apparatus having a reinforced elongated concrete post with two end portions, one said end portion being larger than the other said end portion, a meter box and a power box found in said large portion of said concrete post, said meter box having an opening from one side of said post and said power box having an opening from a second side of said post and having conduit connected to said meter box passing through a portion of said post, said meter box and said power box being operatively connected to each other; a water line located in said elongated concrete post, said water line having a tapped output from said elongated post; and an electrical ground wire electrically connecting said meter and power boxes from said elongated concrete post for insertion into the earth for grounding said meter and power boxes.

2. The apparatus in accordance with claim 1 including said power box and said meter box connected back to back, having a nipple therebetween.

3. The apparatus in accordance with claim 2 including a lifting handle protruding from said concrete post.

4. The apparatus in accordance with claim 3, including a gas line located in said elongated concrete post said gas line having an opening extending from said concrete post.

* * * * *